(12) United States Patent
Matsushita et al.

(10) Patent No.: US 6,785,037 B2
(45) Date of Patent: *Aug. 31, 2004

(54) FARADAY ROTATOR

(75) Inventors: Takeshi Matsushita, Iwata-gun (JP); Mitsuteru Inoue, Okazaki (JP); Hideki Kato, Iwata-gun (JP); Akio Takayama, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 18 days.

This patent is subject to a terminal disclaimer.

(21) Appl. No.: 10/118,227

(22) Filed: Apr. 9, 2002

(65) Prior Publication Data

US 2002/0149832 A1 Oct. 17, 2002

(30) Foreign Application Priority Data

Apr. 16, 2001 (JP) ........................................ 2001-117244

(51) Int. Cl.$^7$ ............................. G02F 1/09; G02F 1/00; G02B 27/28; G02B 5/30
(52) U.S. Cl. ..................... 359/280; 359/281; 359/324; 359/484
(58) Field of Search ................................ 359/280, 289, 359/282, 284, 281, 283, 484, 495, 496, 497, 256, 324; 428/692; 372/37, 94, 703, 33, 26; 324/244.1; 250/227.14

(56) References Cited

U.S. PATENT DOCUMENTS

| | | | | | |
|---|---|---|---|---|---|
| 5,245,471 | A | * | 9/1993 | Iwatsuka et al. | ............ 359/494 |
| 5,668,590 | A | * | 9/1997 | Maruo et al. | ................ 347/256 |
| 5,920,538 | A | * | 7/1999 | Il'Yashenko | ........... 369/110.04 |
| 6,333,806 | B1 | * | 12/2001 | Onaka et al. | ................ 359/283 |
| 6,370,285 | B1 | * | 4/2002 | Naganuma | .................... 385/11 |
| 6,545,795 | B2 | * | 4/2003 | Matsushita et al. | ......... 359/280 |
| 6,590,694 | B2 | * | 7/2003 | Matsushita et al. | ......... 359/280 |
| 2002/0018913 | A1 | * | 2/2002 | Kato et al. | ................... 428/692 |
| 2002/0139974 | A1 | * | 10/2002 | Matsushita et al. | ........... 257/39 |
| 2002/0149833 | A1 | * | 10/2002 | Matsushita et al. | ......... 359/280 |
| 2002/0149924 | A1 | * | 10/2002 | Falicoff et al. | ............... 362/19 |

* cited by examiner

Primary Examiner—Georgia Epps
Assistant Examiner—Brandi Thomas
(74) Attorney, Agent, or Firm—Oliff & Berridge, PLC

(57) ABSTRACT

A Faraday rotator of multilayer film type is provided in which satisfactory optical characteristics are obtained with a small number of layers. In the Faraday rotator, a first periodic dielectric multilayer film made of silicon dioxide $SiO_2$ and tantalum pentaoxide $Ta_2O_5$ is formed on a substrate, then a magneto-optical thin film, and a second periodic dielectric multilayer film made of tantalum pentaoxide $Ta_2O_5$ and silicon dioxide $SiO_2$ are formed sequentially. The first and second periodic dielectric multilayer films sandwich the magneto-optical thin film such that their respective higher refractive dielectric thin films are in contact with the magneto-optical thin film. The number of layers of the first periodic dielectric multilayer film is larger than that of the second periodic dielectric multilayer film.

10 Claims, 6 Drawing Sheets

FARADAY ROTATOR

BACKGROUND OF THE INVENTION

1. Field of the Invention

The present invention relates to a Faraday rotator, which constitutes an optical isolator or an optical circulator for use in an optical fiber communication system, an optical recording system, an optical measurement system or the like.

2. Description of the Related Art

In an optical fiber communications system having a semiconductor laser as a light source, in particular, an optical system based on a high speed digital transmission or an analog direct modulation mode, if reflected light from optical connector joints, optical circuit components and the like which are used in an optical fiber circuit returns to the semiconductor laser or an optical amplifier, it becomes difficult to maintain high quality transmission due to degradation of frequency characteristics or generation of noises. An optical isolator is used for the purpose of removing the reflected light.

As shown in FIG. 11, a conventional optical isolator is constituted by a polarizer 6 and an analyzer 5 both of which transmit only light having a specific plane of polarization, a Faraday rotator 4P composed of a light transmissible substrate 1P and a laminate film 3P formed thereon and adapted to rotate the plane of polarization of light by 45 degrees, and a permanent magnet (not shown) for applying a magnetic field to the Faraday rotator. Among the constituent members of the optical isolator, a Faraday rotator has a primary influence on the performance of the optical isolator. It is important for the Faraday rotator to have a small element length required for rotating the plane of polarization by 45 degrees and a large light transmittance.

Up to now, the Faraday rotator has been made of a yttrium iron garnet (YIG) bulk single crystal (about 2 mm in thickness), or of a bismuth-substituted rare earth iron garnet (BiYIG) thick film single crystal (several hundred $\mu$m in thickness) in which part of yttrium is substituted with bismuth having a large magneto-optical performance index. Recently, the BiYIG thick film single crystal, which is advantageous in downsizing the optical isolator, is employed in many cases.

Further, in recent years, the magneto-optical component (Faraday rotator) made of one-dimensional magneto-photonic crystal which causes the enhancement of the magneto-optical effect due to the localization of light is proposed. Though the above-mentioned magneto-optical component is of polycrystal with a thickness of several $\mu$m, a large Faraday rotation angle can be obtained. Thus, a significant reduction is expected in size and cost of the optical isolator.

This one-dimensional magneto-photonic crystal is structured such that at least one kind of dielectric thin film and a magneto-optical thin film are laminated to form a Fabry-Perot resonator structural. Particularly, with such a structure that a magneto-optical tin film is sandwiched between two periodic dielectric multilayer films, in each of which two kids of dielectric thin fume having different refractive indexes from each other are laminated, magneto-optical effect can be greatly enhanced while it is manufactured easily.

However, such a simple structure causes a problem that light transmittance decreases when the number of layers of the periodic dielectric multilayer films is increased to obtain a larger Faraday rotation angle. It is shown that a multiple Fabry-Perot resonator in which a plurality of Fabry-Perot resonators stacked sandwiching a dielectric thin film is effective in solving the problem. However, this increases significantly the number of layers, pushing up manufacturing cost Under the above-mentioned circumstances, the present inventors have proposed a Faraday rotator 4R with a reflection structure as shown in FIG. 12, in which a metal reflective film 2 is formed on a substrate 1, then a first periodic dielectric multilayer film 3r, a magneto-optical thin film 3m and a second periodic dielectric multilayer film 3r', which has the same number of layers as the first periodic dielectric multiplayer film 3r are sequentially formed on the metal reflective film 2, and in which light Pi made incident on a side on which the metal reflective film 2 is not formed is reflected at the metal reflective film 2. In the Faraday rotator 4R with the above-mentioned structure, aluminum is used for the metal reflective film 2. Thus, the number of layers can be reduced substantially by half in comparison with a conventional transmission type Faraday rotator.

With the above-mentioned reflection structure, the Faraday rotator can be composed of a small number of layers. However, a film forming apparatus dedicated to forming the metal reflective film is required, which hinders reduction in manufacturing cost.

SUMMARY OF THE INVENTION

The present invention has been made to solve the above problem, and it is therefore an object of the present invention to provide a Faraday rotator with a reflection structure, which does not use a metal reflective film, that is, which is constituted of a magneto-optical thin film and dielectric multilayer films only.

In order to attain the above-mentioned object, according to a first aspect of the present invention, there is provided a Faraday rotator which includes a laminate film comprising a fist periodic dielectric multilayer film in which two kinds of dielectric thin films having refractive indexes different from each other are alternately laminated with regularity in each thickness thereof, a second periodic dielectric multilayer film in which two kinds of dielectric thin films having refractive indexes different from each other are alternately laminated with regularity in each thickness thereof, and a magneto-optical thin film which is sandwiched between the first and second periodic dielectric multilayer films, wherein the number of layers of the first periodic dielectric multilayer film is different from that of the second periodic dielectric multilayer film.

According to a second aspect of the present invention, there is provided a Faraday rotator including a laminate film comprising a first periodic dielectric multilayer film in which two kinds of dielectric thin films having refractive indexes different from each other are alternately laminated with regularity in each thickness thereof a second periodic dielectric multilayer film in which two kinds of dielectric thin films having refractive indexes different from each other are alternately laminated with regularity in each thickness thereof, and a magneto-optical thin film which is sandwiched between the first and second periodic dielectric multilayer films, wherein the first and second periodic dielectric multilayer films are each structured such that one dielectric thin film having a higher refractive index of the two kinds is in contact with the magneto-optical thin film, the number of layers of the first periodic dielectric multilayer film is larger than that of the second periodic dielectric multilayer film, and a dielectric thin film with a large refractive index is added between the laminate film and a substrate.

According to a third aspect of the present invention, in the second aspect an optical length of the additional dielectric thin film with a high refractive index is λ/4 where λ is a wavelength of light, According to a fourth aspect of the present invention, in any one of the first to third aspects, at least one of layers constituting the periodic dielectric multilayer film is substituted by a magneto-optical thin film.

BRIEF DESCRIPTION OF THE DRAWINGS

The above and other objects as well as advantages of the present invention will become clear by the following description of the preferred embodiments of the present invention with reference to the accompanying drawings, wherein.

DETAILED DESCRIPTION OF THE PREFERRED EMBODIMENTS

In the following embodiments, a bismuth-substituted rare earth iron garnet (BiYIG, refractive index: 2.36) is used for a magneto-optical thin film, tantalum pentaoxide $Ta_2O_5$ (refractive index: 2.14) is used for a dielectric thin film having a higher refractive index, and silicon dioxide $SiO_2$ (refractive index: 1.42) is used for a dielectric thin film having a lower refractive index which, together with the dielectric thin film having a higher refractive index, constitutes a periodic dielectric multilayer film. The wavelength of light λ is set to 1300 nm.

Figure 1:
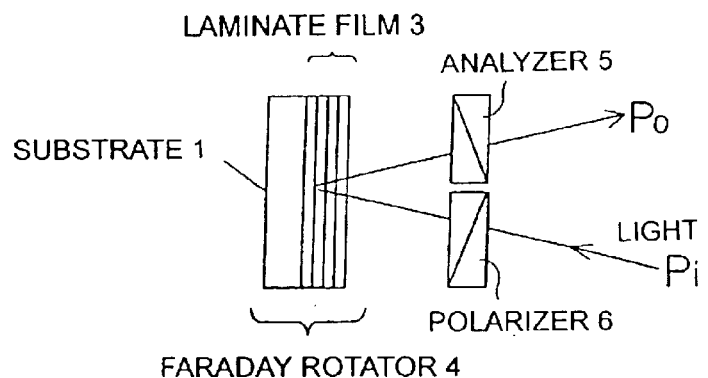
FIG. 1 is an explanatory diagram of a Faraday rotator of the present invention.

In FIG. 1, incident light Pi enters a polarizer 6, is reflected and rotated by a predetermined Faraday rotation angle by a Faraday rotator 4, and passes through an analyzer 5 to exit out as outgoing light Po. The Faraday rotator 4 is structured such that a laminate film 3 is formed on a substrate 1. Embodiments of the present invention in FIG. 1 are hereinafter described in detail with reference to FIGS. 2 to 10.

Figure 2:
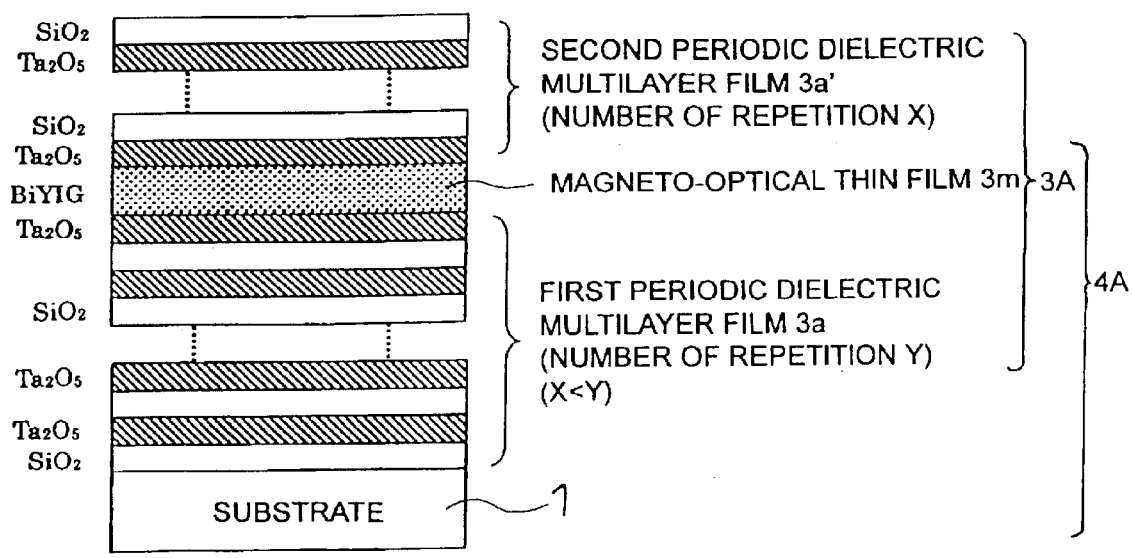
FIG. 2 is a cross sectional view of a film structure for explaining a first embodiment of the Faraday rotator according to the present invention.

In a first embodiment of the present invention shown in FIG. 2, a Faraday rotator 4A has a film structure ($SiO_2$/$Ta_2O_5$)$^X$/BiYIG/($Ta_2O_5$/$SiO_2$)$^Y$ (X<Y), where X and Y indicate the number of bilayers ($SiO_2$/$Ta_2O_5$) and ($Ta_2O_5$/$SiO_2$), respectively, and Y is larger than X. That is, a magneto-optical thin film $3m$ is sandwiched between a first periodic dielectric multilayer film $3a$ and a second periodic dielectric multilayer film $3a'$, which are each structured such that one dielectric film having a higher refractive index of the two kinds is in contact with the magneto-optical thin film.

The first periodic dielectric multilayer film $3a$ composed of Y times of bilayers each consisting of silicon dioxide $SiO_2$ and tantalum pentaoxide $Ta_2O_5$, is formed on the substrate 1. The magneto-optical thin film $3m$ is formed on the first periodic dielectric multilayer film $3a$, and fierier the second periodic dielectric multilayer film $3a'$ composed of X times of bilayers each consisting of tantalum pentaoxide $Ta_2O_5$ and silicon dioxide $SiO_2$ is firmed on the magneto-optical thin film $3m$. The number Y is larger than the number X.

Figure 3:
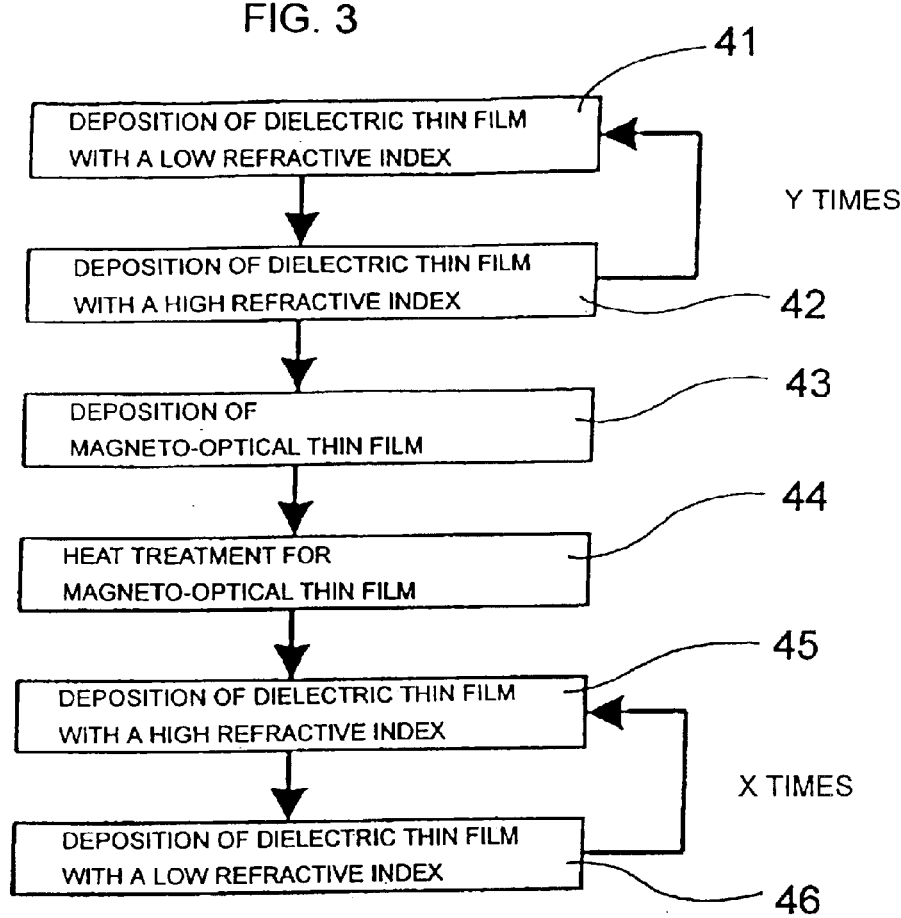
FIG. 3 is a flow chart explaining a process of manufacturing the Faraday rotator shown in FIG. 2.

The process of manufacturing the Faraday rotator 4A in FIG. 2 will hereinafter be described with reference to FIG. 3. A dielectric thin film with a lower refractive index (hereinafter referred to as "lower refractive dielectric thin film") $SiO_2$ having an optical length of λ/4 is formed taking into consideration an incidence angle of light (Step 41), then a dielectric thin film with a higher refractive index (hereinafter referred to as "higher refractive dielectric thin film") $Ta_2O_5$ having an optical length of λ/4 is formed (Step 42). The Steps 41 and 42 are alternately repeated Y times, respectively, whereby the first periodic dielectric multilayer film ($Ta_2O_5$/$SiO_2$)$^Y$ $3a$ is manufactured which serves as a reflecting mirror in a Fabry-Perot resonator. Here, thin film forming techniques such as sputtering and vapor-deposition can be used.

Next, a bismuth-substituted rare earth iron garnet (BiYIG) as the magneto-optical thin film $3m$ having an optical length of λ/2 is formed on the first periodic dielectric multilayer film ($Ta_2O_5$/$SiO_2$)$^Y$ $3a$ (Step 43). Also here, the thin film forming techniques used at the Steps 41 and 42 can be used, but it is important to control precisely the composition of the magneto-optical thin film in order to obtain a desired Faraday effect.

When the bismuth-substituted rare earth iron garnet (BiYIG) is used for the magneto-optical thin film $3m$, the film gets an amorphous structure at the Step 43 and hence does not have magnetism. For this reason, the magneto optical thin film $3m$ is subjected to heat treatment at a high temperature to be crystallized (Step 44). The heat treatment may be wed out using a normal electric furnace depending on the combination of the dielectric Elms of the two kinds and the heat treatment temperature. Further, when a problem is caused by the turbulence of the multilayer film structure, which is generated due to the heat treatment, an infrared beam heating system may be employed which is devised by the present inventors and is disclosed in Japanese Patent Laid-open No. P2001-110635A.

Next, the second periodic dielectric multilayer film $3a'$ that serves as another reflecting mirror is formed in an order reverse to the steps 41 and 42 (Steps 45 and 46). Specifically, a higher refractive dielectric thin film $Ta_2O_5$ having an optical length of $\lambda/4$ is formed (Step 45), and then a lower refractive dielectric thin film $SiO_2$ having an optical length of $\lambda/4$ is formed (Step 46).

The Steps 45 and 46 are alternately repeated X times, respectively, whereby the second periodic dielectric multilayer film $(SiO_2/Ta_2O_5)^X$ 3a' is manufactured. Thus, a laminate film 3A is formed on the substrate 1. The laminate film 3A is cut to a predetermined size together with the substrate 1 using a dicing machine or the like, to thereby complete the Faraday rotator 4A.

Figure 4:
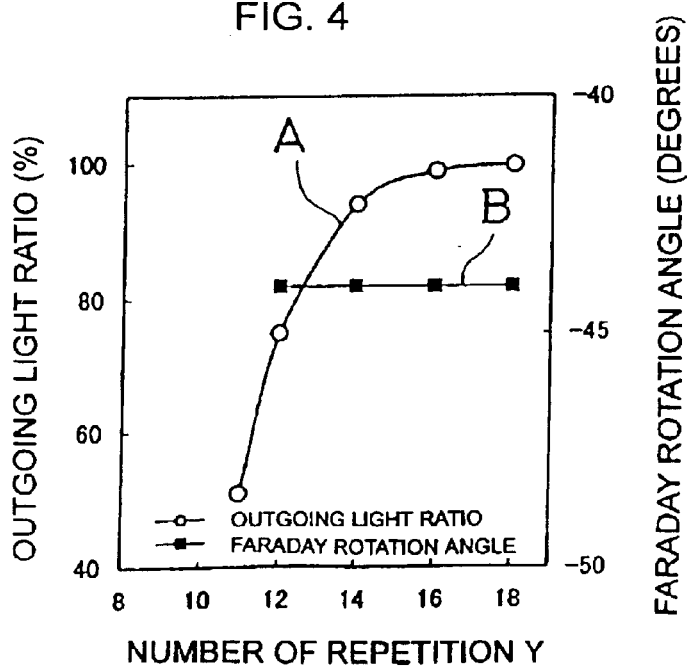
FIG. 4 is a graphical representation showing an influence of the number of repetition in a first periodic dielectric multilayer film on magneto-optical characteristics in the Faraday rotator according to the first embodiment.

In FIG. 4, the magneto-optical characteristics are shown which are obtained when the number X is fixed to 9 with the number Y changed from 11 to 18. The left vertical axis indicates an outgoing light ratio A ((amount of light emitted from the Faraday rotator/amount of light made incident on the Faraday rotator)×100) %, the right vertical axis indicates a Faraday rotation angle B, and the horizontal axis indicates the number Y. When the number Y is increased, the outgoing light ratio A improves. An outgoing light ratio of 90% or more can be obtained when the number Y is 14.

Figure 5:
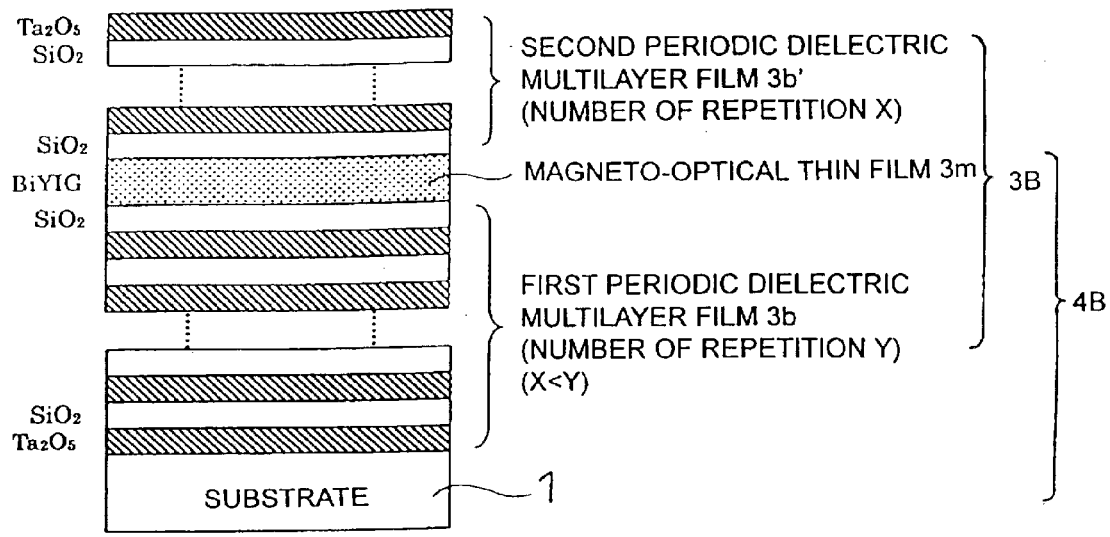
FIG. 5 is a cross sectional view of a film structure for explaining a second embodiment of the Faraday rotator according to the present invention.

In a second embodiment of the present invention shown in FIG. 5, a Faraday rotator 4B has a film structure $(Ta_2O_5/SiO_2)^X/BiYIG/(SiO_2/Ta_2O_5)^Y$ (X<Y). Here, X and Y indicate the number of bilayers $(Ta_2O_5/SiO_2)$ and $(SiO_2/Ta_2O_5)$, respectively. The difference from the first embodiment shown in FIG. 2 is that the first and second periodic dielectric multilayer films 3b and 3b' are each structured such that one dielectric thin film having a lower refractive index of the two kinds is in contact with the magneto-optical thin film 3m.

Figure 6:
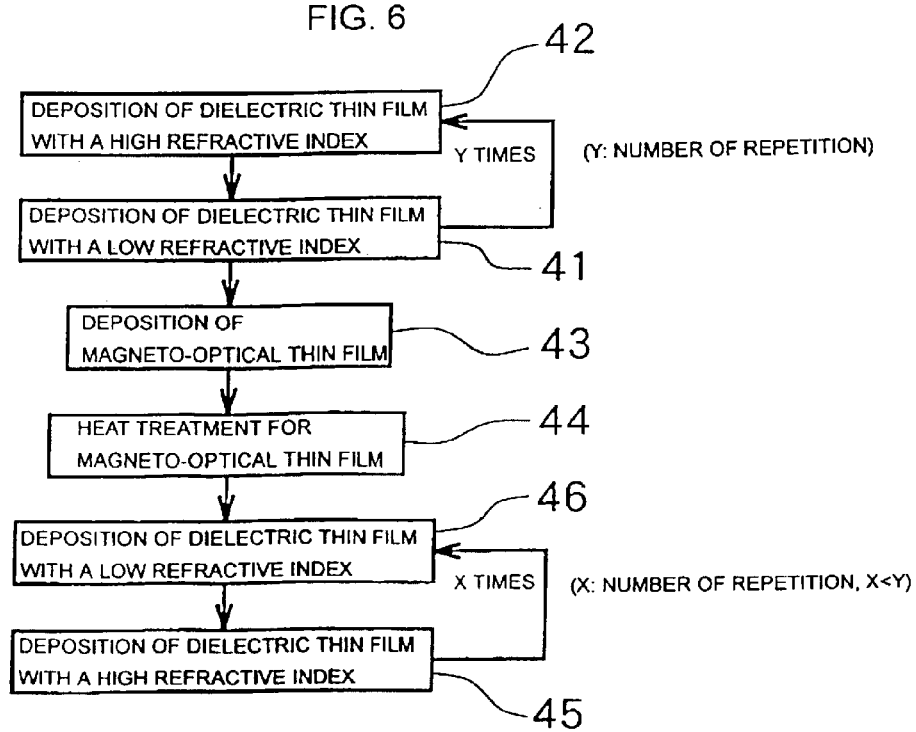
FIG. 6 is a flow chart explaining a process of manufacturing the Faraday rotator shown in FIG. 5.

The process of manufacturing the Faraday rotator 4B shown in FIG. 5 is hereinafter described with reference to FIG. 6. A higher refractive dielectric thin film $Ta_2O_5$ having an optical length of $\lambda/4$ is formed taking into consideration an incidence angle of light (Step 42). Thereafter, a lower refractive dielectric thin film $SiO_2$ having an optical length of $\lambda/4$ is formed (Step 41). The Steps 42 and 41 are alternately repeated Y times, respectively, thus the first periodic dielectric multilayer film $(SiO_2/Ta_2O_5)^Y$ 3b is manufactured which serves as a reflecting mirror in a Fabry-Perot resonator. Here, thin film forming techniques used for the first embodiment can be used.

Next, a bismuth-substituted rare earth iron garnet (BiYIG) as the magneto-optical thin film 3m having an optical length of $\lambda/2$ is formed on the first periodic dielectric multilayer film $(SiO_2/Ta_2O_5)^Y$ 3b (Step 43). Also here, the thin film forming techniques used at the Steps 42 and 41 can be used, but it is important to control precisely the composition of the magneto-optical thin film in order to obtain a desired Faraday effect.

When the bismuth-substituted rare earth iron garnet (BiYIG) is used as the magneto-optical thin film 3m, the film gets an amorphous structure at the Step 43 and hence does not have magnetism. Therefore, the magneto-optical thin film 3m is subjected to heat treatment at a high temperature to be crystallized (Step 44). The heat treatment may be carried out using a normal electric furnace depending on the combination of the dielectric thin films of the two kinds and the heat treatment temperature. Further, when a problem is caused by the turbulence of the multilayer film structure, which is generated due to the heat treatment, the aforementioned infrared beam heating system may be employed.

Next, the second periodic dielectric multilayer film 3b' that serves as another reflecting mirror in a Fabry-Perot resonator is formed in an order reverse to the Steps 42 and 41 (Steps 46 and 45). A lower refractive dielectric thin film $SiO_2$ having an optical length of $\lambda/4$ is formed (Stop 46), and then a higher refractive dielectric thin film $Ta_2O_5$ having an optical length of $\lambda/4$ is formed (Step 45).

The Steps 46 and 45 are alternately repeated X times, respectively, whereby the second periodic dielectric multilayer film $(Ta_2O_5/SiO_2)^X$ 3b' is manufactured. Thus, a laminate film 3B is formed on the substrate 1. The laminate film is cut to a predetermined size together with the substrate using a dicing machine or the like to complete the Faraday rotator 4B.

Figure 7:
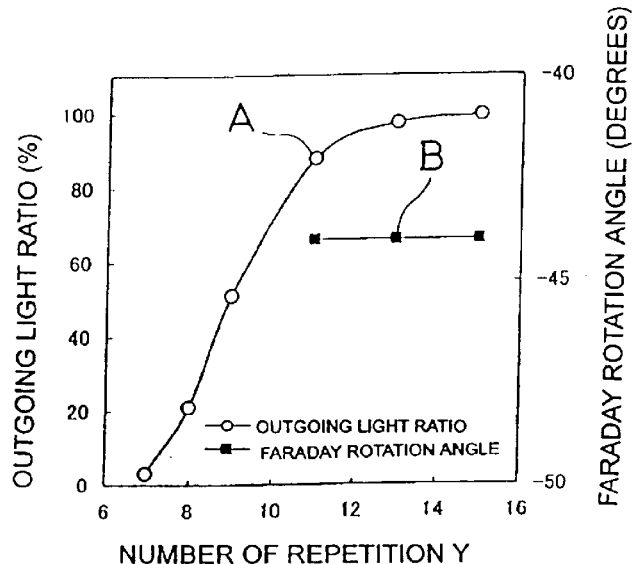
FIG. 7 is a graphical representation showing an influence of the number of repetition in a first periodic dielectric multilayer film on magneto-optical characteristics in the Faraday rotator according to the second embodiment.

In FIG. 7, the magneto-optical characteristics are shown which are obtained when the number X is fixedly set to 7 with the number Y changed from 7 to 15. The left vertical axis indicates an outgoing light ratio A, the right vertical axis indicates a Faraday rotation angle B, and the horizontal axis indicates the number Y. When the number Y is increased, the outgoing light ratio A increases. An outgoing light ratio of 90% or more can be obtained when the number Y is 12.

Figure 8:
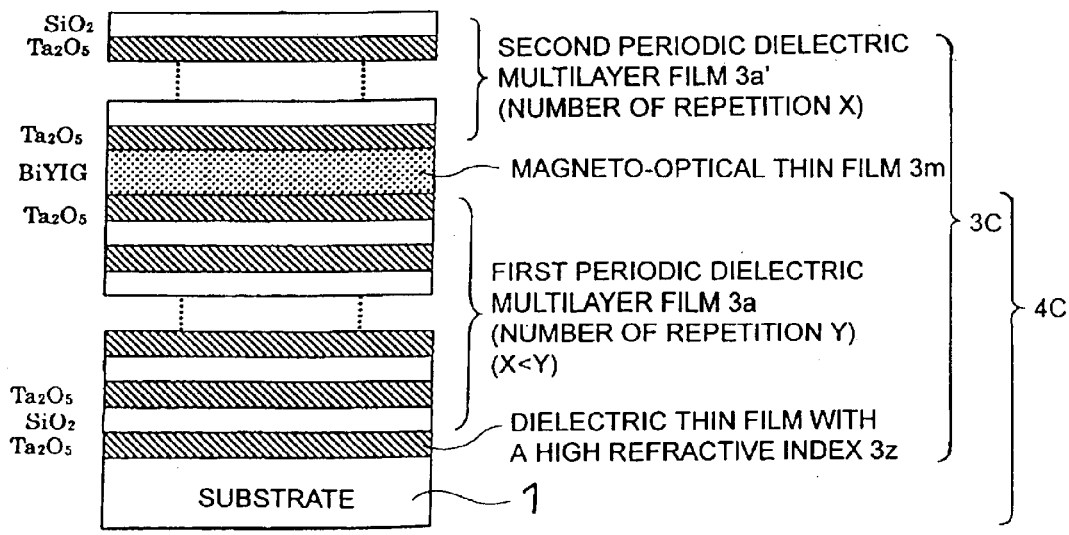
FIG. 8 is a cross sectional view of a film structure for explaining a third embodiment of the Faraday rotator according to the present invention.

In a third embodiment of the present invention shown in FIG. 8, a Faraday rotator 40 has a film structure $(SiO_2/Ta_2O_5)^X/BiYIG/(Ta_2O_5/SiO_2)$, (X<Y). Here, X and Y indicate the number of bilayers $(SiO_2/Ta_2O_5)$ and $(Ta_2O_5/SiO_2)$, respectively. The difference from the first embodiment shown in FIG. 2 is that a dielectric thin film with a high refractive index 3z is added between the first periodic dielectric multilayer film 3a and the substrate 1. Note that the dielectric thin film with a high refractive index 3z does not have to be identical with the higher refractive dielectric thin film which constitutes the periodic dielectric multilayer films, but the workability is enhanced if it is.

Figure 9:
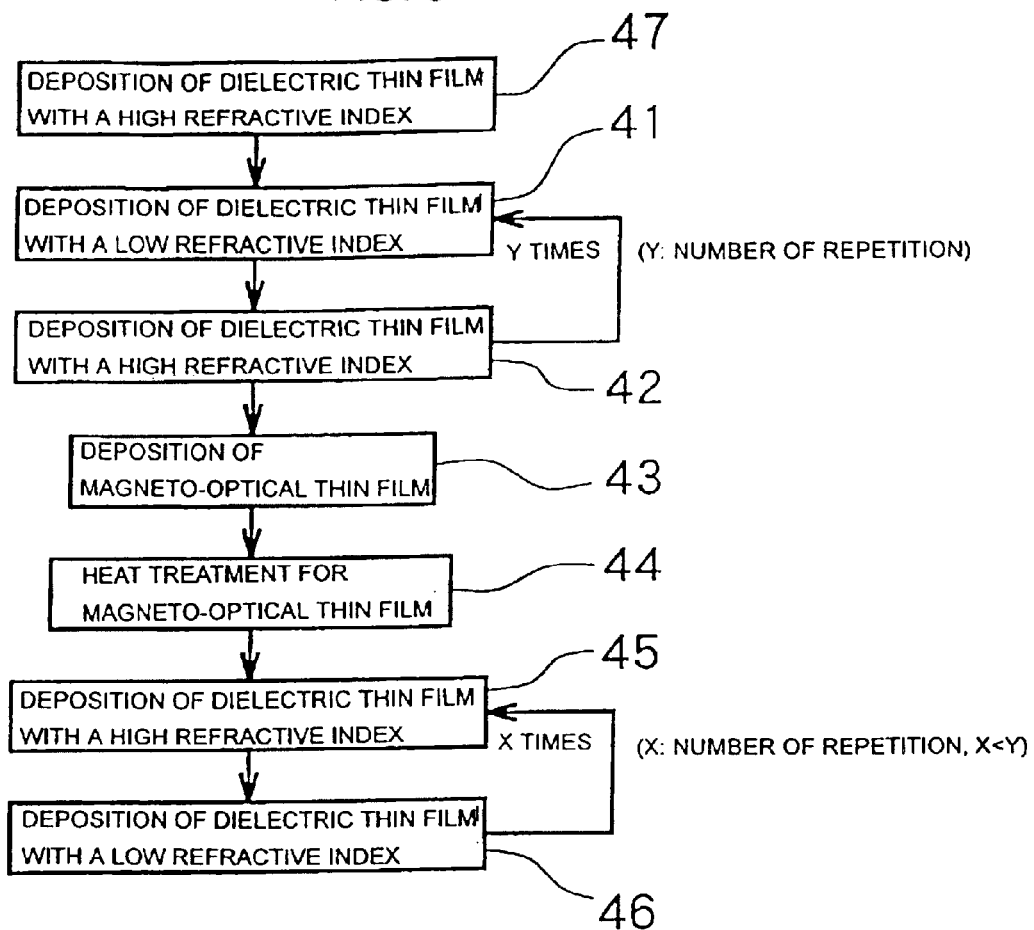
FIG. 9 is a flow chart explaining a process of manufacturing the Faraday rotator shown in FIG. 8.

The process of manufacturing the Faraday rotator 4C shown in FIG. 8 is shown in FIG. 9. $Ta_2O_5$ as the dielectric thin film with a high refractive index 3z having an opal length of $\lambda/4$ is formed on the substrate 1 taking into consideration an incidence angle of light (Step 47). Then, the process (FIG. 3) for the first embodiment shown follows, and a laminate film 3C is formed on the substrate 1. The laminate film is cut to a predetermined size using a dicing machine or the like to complete the Faraday rotator 4C.

Figure 10:
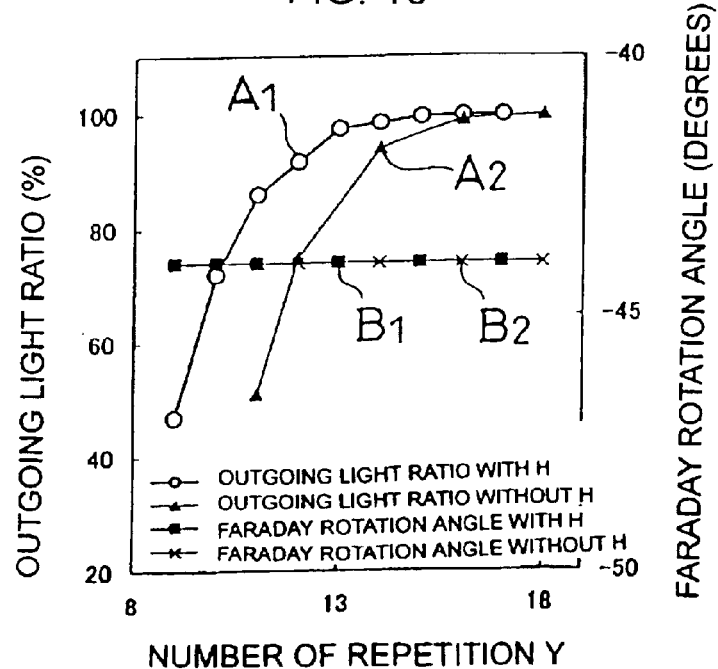
FIG. 10 is a graphical representation showing an influence of the number of repetition in a first periodic dielectric multilayer elm on magneto-optical characteristics in the Faraday rotator according to the third embodiment.
Figure 11:
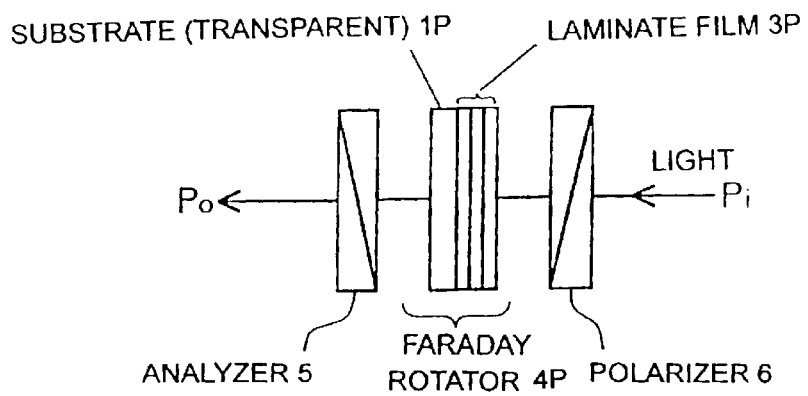
FIG. 11 is a structural diagram of a conventional optical isolator.
Figure 12:
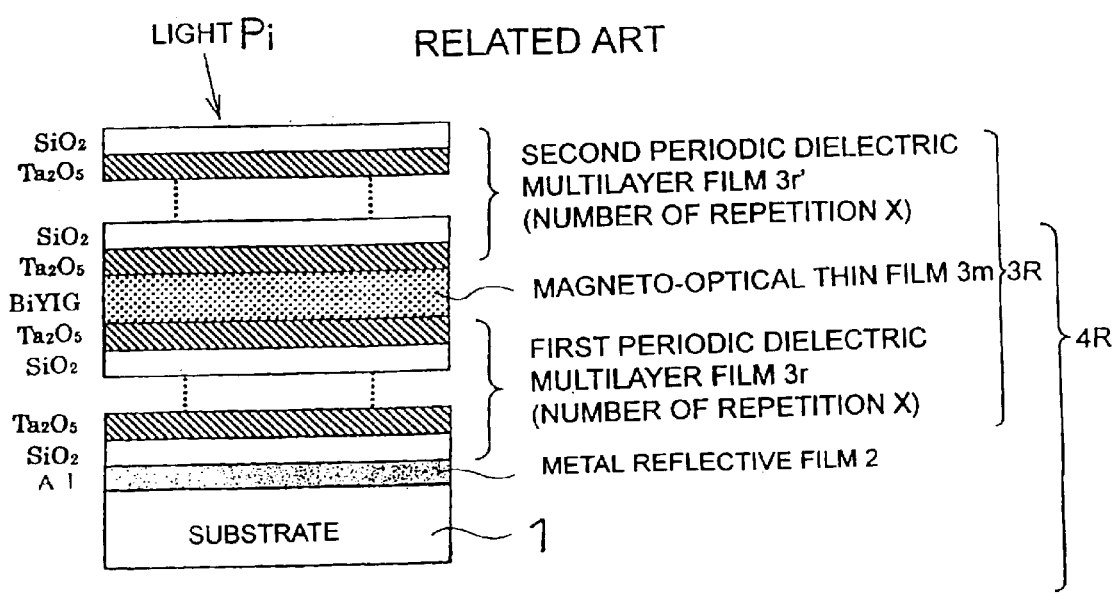
FIG. 12 is a cross sectional view of a film structure for explaining a Faraday rotator with a reflection structure of related art.

In FIG. 10, the magneto-optical characteristics are shown which are obtained when the number X is 9 with the number Y changed from 9 to 18. The left vertical axis indicates an outgoing light ratio A, the right vertical indicates a Faraday rotation angle B, and the horizontal axis indicates the number Y.

FIG. 10 shows the difference made by the existence of the dielectric thin film with a high refractive index 3z (denoted by reference symbol H in the figure) additionally provided between the first periodic dielectric multilayer film 3a and the substrate 1. That is, an outgoing light ratio A1 and a Faraday rotation angle B1 are obtained when the additional dielectric thin film 3z exists while an outgoing light ratio A2 and a Faraday rotation angle B2 are obtained when it does not exist.

While the Faraday rotation angles B1 and B2 do not make any difference from each other regardless of the existence of the additional dielectric thin film 3z and are not dependent on the number Y staying approximately constant (−45 degrees), the outgoing light ratios A1 and A2 differ from each other depending on the number Y. When Y is set to 12 or more, an outgoing light ratio of 90% or more is obtained. This indicates a significant increase in comparison with 70% of A2 obtained when the additional dielectric thin film 3z is not present.

In the first, second and third embodiments, light is made incident on the laminate film. However, light may be made incident on the side of the substrate. In this case, the order of the film deposition must be inverted, and the substrate must be transparent and provided with a non-reflective coating film. Further, a part or all of the layers of the periodic dielectric multilayer films may be substituted with magneto-optical thin fibs for the purposes of conducting a fine adjustment of the Faraday rotation angle and reducing the number of layers.

According to the first aspect of the present invention, the Faraday rotator does not employ an aluminum (Al) film as a metal reflective film, and therefore an apparatus dedicated for forming the metal reflective Mm is not required According to the second aspect of the present invention, the Faraday rotator can be of a reflection structure without forming a metal reflective film, thereby exhibiting a high performance with a reduce number of layers.

According to the third aspect of the present invention, the outgoing light ratio of the Faraday rotator can be increased.

According to the fourth aspect of the present invention, the Faraday rotation angle can be fine adjusted.

What is claimed is:

1. A Faraday rotator including a laminate film comprising a first periodic dielectric multilayer film in which two kinds of dielectric thin films having refractive indexes different from each other are alternately laminated with regularity in each thickness thereof, a second periodic dielectric multilayer film in which two kinds of dielectric thin films having refractive indexes different from each other are alternately laminated with regularity in each thickness thereof, and a magneto-optical thin film which is sandwiched between the first and second periodic dielectric multilayer films, wherein a number of layers of the first periodic dielectric multilayer film is different from that of the second periodic dielectric multilayer film.

2. A Faraday rotator including a laminate film comprising a first periodic dielectric multilayer film in which two kinds of dielectric thin films having refractive indexes different from each other are alternately laminated with regularity in each thickness thereof, a second periodic dielectric multilayer film in which two kinds of dielectric thin films having refractive indexes different from each other are alternately laminated with regularity in each thickness thereof, and a magneto-optical thin film which is sandwiched between the first and second periodic dielectric multilayer films, wherein the first and second periodic dielectric multilayer films are each structured such that one dielectric thin film having a higher refractive index of the two kinds is in contact with the magneto-optical thin film, wherein a number of layers of the first periodic dielectric multilayer film is larger than that of the second periodic dielectric multilayer film, and wherein a dielectric thin film with a high refractive index is additionally provided between the laminate film and a substrate on which the laminate film is formed.

3. A Faraday rotator according to claim 2, wherein an optical length of the additional dielectric thin film with a high refractive index is $\lambda/4$ where $\lambda$ is a wavelength of light.

4. A Faraday rotator according to claim 1, wherein at least one of layers constituting the first or second periodic dielectric multilayer film is substituted by a magneto-optical thin film.

5. A Faraday rotator according to claim 2, wherein at least one of layers constituting the first or second periodic dielectric multi layer film is substituted by a magneto-optical thin film.

6. A Faraday rotator according to claim 3, wherein at least one of layers constituting the first or second periodic dielectric multilayer film is substituted by a magneto-optical thin film.

7. A Faraday rotator according to claim 1, wherein the dielectric thin films are stacked on top of each other.

8. A Faraday rotator according to claim 2, wherein the dielectric thin films are stacked on top of each other.

9. A Faraday rotator according to claim 1, wherein the magneto-optical thin film is for generating a Faraday effect.

10. A Faraday rotator according to claim 2, wherein the magneto-optical thin film is for generating a Faraday effect.

* * * * *